United States Patent
Brown et al.

(10) Patent No.: US 6,922,753 B2
(45) Date of Patent: Jul. 26, 2005

(54) CACHE PREFETCHING

(75) Inventors: Jeffrey D. Brown, Rochester, MN (US); John D. Irish, Rochester, MN (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 10/255,490

(22) Filed: Sep. 26, 2002

(65) Prior Publication Data

US 2004/0064648 A1 Apr. 1, 2004

(51) Int. Cl.[7] .............................................. G06F 12/00
(52) U.S. Cl. ................................. 711/137; 712/207
(58) Field of Search ............................... 711/118, 137, 711/141; 712/207; 717/158; 718/102

(56) References Cited

U.S. PATENT DOCUMENTS

| | | | | | |
|---|---|---|---|---|---|
| 5,787,478 | A | * | 7/1998 | Hicks et al. | 711/141 |
| 5,802,567 | A | * | 9/1998 | Liu et al. | 711/133 |
| 5,872,972 | A | * | 2/1999 | Boland et al. | 718/102 |
| 6,119,218 | A | * | 9/2000 | Arora et al. | 712/207 |
| 6,134,710 | A | * | 10/2000 | Levine et al. | 717/158 |
| 6,473,832 | B1 | * | 10/2002 | Ramagopal et al. | 711/118 |
| 6,757,787 | B2 | * | 6/2004 | Shen et al. | 711/141 |

* cited by examiner

*Primary Examiner*—Nasser Moazzami
(74) *Attorney, Agent, or Firm*—Moser Patterson & Sheridan, LLP

(57) ABSTRACT

Method and apparatus for prefetching cache with requested data are described. A processor initiates a read access to main memory for data which is not in the main memory. After the requested data is brought into the main memory, but before the read access is reinitiated, the requested data is prefetched from main memory into the cache subsystem of the processor which will later reinitiate the read access.

16 Claims, 2 Drawing Sheets

CACHE PREFETCHING

BACKGROUND OF THE INVENTION

1. Field of the Invention

The present invention generally relates to cache prefetching, and more particularly to cache prefetching in a computer system.

2. Description of the Related Art

Users of data processing systems continue to demand greater performance for handling increasingly complex and difficult tasks. Greater performance from the processors that operate such systems may be obtained through faster clock speeds so the individual instructions are processed more quickly. However, processing speed has increased much more quickly than the speed of main memory. Despite the speed of a processor, a bottleneck on computer performance is that of transferring information between the processor and memory. Therefore, cache memories, or caches, are often used in many data processing systems to increase performance in a relatively cost-effective manner.

A cache is typically a relatively faster memory that is intermediately coupled between one or more processors and a bank of slower main memory. Cache speeds processing by maintaining a copy of repetitively used information in its faster memory. Whenever an access request is received for information not stored in cache, the cache typically retrieves the information from main memory and forwards the information to the processor. If the cache is full, typically the least recently used information is discarded or returned to main memory to make room for more recently accessed information.

The benefits of a cache are realized whenever the number of requests to address locations of cached information (known as "cache hits") are maximized relative to the number of requests to memory locations containing non-cached information (known as "cache misses"). Despite the added overhead that occurs as a result of a cache miss, as long as the percentage of cache hits is high (known as the "hit rate"), the overall processing speed of the system is increased.

By way of illustration, assume that a processor performing a first task initiates a read access to main memory for data (or instruction). A segment unit in the processor generates an effective address (also called a linear address, which is an address in the programmer's perspective) which is applied to a paging unit of the processor. The paging unit can be implemented as a separate entity from the processor. The paging unit receives the effective address and determines whether the page containing the requested data currently resides in the main memory. Memory address space is divided into blocks called pages. The main memory is also divided into blocks called page frames. When a page is brought from disk into the main memory, the page occupies a page frame in the main memory.

If the paging unit determines that the page containing the requested data currently resides in the main memory, the paging unit generates a real address (also called a physical address) of the requested data to the processor's address pins. In response, a cache subsystem associated with the processor receives the real address and performs a lookup (search) to determine whether the cache subsystem contains a valid copy of the requested data. Assume that the cache subsystem is a look-through cache, i.e., a type of cache which intercepts all processor's read accesses to main memory. If the look-through cache has a valid copy of the requested data, the look-through cache provides the processor with the requested data and no read bus cycle is initiated on the system bus. If the look-through cache does not have a valid copy of the requested data, the look-through cache initiates a read bus cycle on the system bus to obtain the requested data from the main memory for the processor.

If the paging unit determines that the page containing the requested data does not currently reside in the main memory, a page fault occurs. In response to the page fault, the processor stops the read access to main memory, switches to and executes a page fault handler of the operating system to set up for the transfer of the page containing the requested data from the mass storage device into the main memory, and switches to a second task. The page containing the requested data will occupy a page frame in the main memory.

When the page containing the requested data has been brought into the main memory, the processor (or perhaps another processor, in symmetric multiprocessor systems) switches back to the first task and reinitiates the read access to main memory. Again, the paging unit receives the generated effective address from the segment unit and determines whether the page containing the requested data currently resides in the main memory. Because the page has previously been brought into the main memory, the paging unit generates the real address of the requested data to the processor's address pins. In response, the cache subsystem receives the real address and performs a lookup to determine whether the cache subsystem contains a valid copy of the requested data. Because the page containing the requested has just been brought into the main memory, the cache subsystem does not have a valid copy of the requested data. This is because the change in content of the page frame which receives the page containing the requested data has invalidated any cache line corresponding to the real address of the requested data (if any). As a result, a cache miss occurs and a read bus cycle is initiated to access the main memory for the requested data. The requested data is forwarded from the main memory to the processor. The cache subsystem may also get a copy of the requested data for itself.

Cache misses are undesirable, especially in computer systems using look-through cache subsystems. First, it takes time for a look-through cache to perform a lookup. Only after the look-through cache finds that it does not have a valid copy of the requested data, the cache initiates a read bus cycle on the system bus to obtain the requested data from the main memory. The time it takes a look-through cache to perform a lookup is called lookup penalty. Second, in any cache type, as a result of a cache miss, a read bus cycle must be performed to obtain the requested data from the slow main memory. Moreover, the read bus cycle uses the system bus to transmit the requested data from the main memory to the requesting processor. As a result, less system bus bandwidth is left for use by other bus masters in the system.

In the above description of the operation of the conventional computer system, the cache miss caused by the reinitiating of the read access after the page fault is of particular interest. In database transaction applications, it is likely that a read access to memory for data will cause such a cache miss. This is because the databases in these applications are usually many times larger than the main memory and, therefore, only a small portion of these databases can reside in the main memory at any given time (i.e., most of these databases reside on disk). As a result, it often occurs that the page containing the requested data does not reside in the main memory and, as a result, the cache does not have a valid copy of the requested data. Therefore, the read access will likely cause a page fault and then a cache miss when the read access is reinitiated after the page containing the requested data is brought into the main memory. Performance analysis has shown that with a cache size of 1 Gbytes, the number of such cache misses approaches 20% of the total number of cache misses. These cache misses are considered compulsory misses because no modifications to the cache structure (capacity, line size, associativity, replacement policy, etc.) will result in a reduction in the miss rate. These compulsory cache misses are undesirable and are a disadvantage of conventional computer systems.

Accordingly, there is a need for an apparatus and method for performing read accesses to main memory which overcomes shortcomings existing in the prior art.

SUMMARY OF THE INVENTION

In one embodiment, a method for cache prefetching is described. The method comprises (a) initiating a read access to a main memory to request data from the main memory, (b) bringing a page containing the requested data into the main memory if the requested data is not in the main memory, (c) prefetching the requested data from the main memory into a cache of a processor in response to the requested data being brought into the main memory, and (d) reinitiating the read access with the processor to retrieve the prefetched requested data from the cache.

In another embodiment, a digital system for cache prefetching is described. The digital system comprises a processor, a cache associated with the processor, and a main memory. The digital system is configured to (a) initiate a read access to the main memory to request data, (b) bring a page containing the requested data into the main memory if the requested data is not in the main memory, and (c) prefetch the requested data from the main memory into the cache in response to the requested data being brought into the main memory. The processor is configured to reinitiate the read access to retrieve the prefetched requested data from the cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
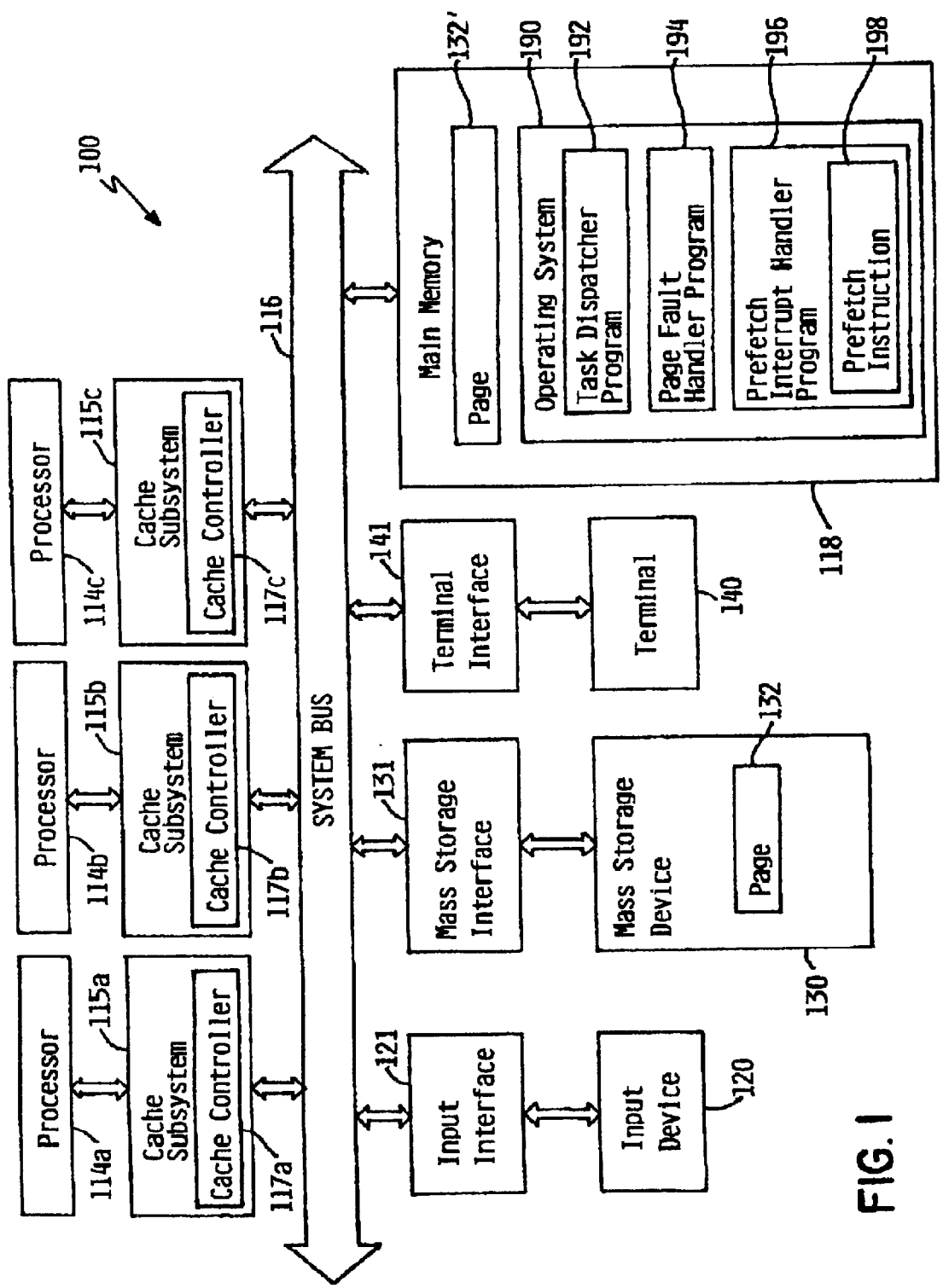
FIG. 1 is a digital system 100 according to one embodiment.

Embodiments of the present invention may be implemented in hardware or software. Aspects described hereinafter, whether in the context of hardware or software, may be identified based upon the application/function for which they are implemented in a specific embodiment of the invention. However, it should be appreciated that any particular nomenclature that follows is used merely for convenience, and thus the invention should not be limited to use solely in any specific application identified and/or implied by such nomenclature.

In the case of a software implementation, the routines executed to implement some embodiments of the invention, whether implemented as part of an operating system or a specific application, component, program, object, module or sequence of instructions may be generally referred to as "computer program(s)," "program(s)", "code" or "code portion" or any other suitable language. In any case, the inventive code typically comprises one or more instructions that are resident at various times in various memory and storage devices in a computer, and that, when read and executed by one or more processors in a computer, cause that computer to perform the steps necessary to execute steps or elements embodying the various aspects of the invention.

In the context of software embodiment, those skilled in the art will appreciate that the various embodiments of the invention are capable of being distributed as a program product in a variety of forms, and that the invention applies equally regardless of the particular type of signal bearing media used to actually carry out the distribution. Accordingly, one embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Embodiments are provided in which a method and an apparatus for prefetching requested data (hereafter, data means data or instruction(s)) are described. A processor initiates a read access to main memory for data which is not in the main memory. After the requested data is brought into the main memory, but before the read access is reinitiated, the requested data is prefetched from main memory into the cache subsystem of the processor which will later reinitiate the read access. As a result, when the processor reinitiates the read access, there is a cache hit and the requested data is provided to the processor by the associated cache subsystem.

FIG. 1 is a computer system 100 according to one embodiment of the present invention. In general, the computer system 100 may be a desktop or PC-based computer, a workstation, a network terminal, or any other networked computer system. Illustratively, the computer system 100 includes a system bus 116. Illustratively, the computer system 100 is a multiprocessor system comprising processors 114a, 114b, and 114c (collectively, processors 114). However, the computer system 100 may also be a uni-processor system.

The processors 114a, 114b, and 114c are coupled to the system bus 116 via cache subsystems 115a, 115b, and 115c, respectively. The cache subsystems 115a, 115b, and 115c comprise, illustratively, cache controllers 117a, 117b, and 117c, respectively. For illustration, the cache subsystems 115a, 115b, and 115c can be look-through cache subsystems.

The computer system 100 could include a number of operators and peripheral systems as shown, for example, by a terminal 140 coupled to the system bus 116 via a terminal interface 141, an input device 120 coupled to the system bus 116 via an input interface 121 and a mass storage device 130 coupled to the system bus 116 via a mass storage interface 131. In one embodiment of the present invention, the terminal 140 can be any display device such as a cathode ray tube (CRT) or a plasma screen. Input device 120 can be any device to give input to the computer system 100. For example, a keyboard, keypad, light pen, touch screen, button, mouse, track ball, or speech recognition unit could be used. Further, although shown separately, the terminal 140 and input device 120 could be combined. For example, a display screen with an integrated touch screen, a display with an integrated keyboard or a speech recognition unit combined with a text speech converter could be used.

In one embodiment of the present invention, the mass storage device 130 can be DASD (Direct Access Storage Device), although it could be any other storage such as floppy disc drives or optical storage. Although mass storage device 130 is shown as a single unit, it could be any combination of fixed and/or removable storage devices, such as fixed disc drives, floppy disc drives, tape drives, removable memory cards, or optical storage. Main memory 118 and storage device 130 could be part of one virtual address space spanning multiple primary and secondary storage devices.

In one embodiment of the present invention, the contents of main memory 118 can be loaded from and stored to the mass storage device 130 as the processors 114 have a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices. In one embodiment of the present invention, the main memory 118 stores an operating system 190, which comprises a task dispatcher program 192, a page fault handler program 194, and a prefetch interrupt handler program 196.

In one embodiment of the present invention, when one of the processors 114 initiates a read access to main memory 118 for data which is not in the main memory 118, the requested data is brought into the main memory 118. In one embodiment of the present invention, the read access causes a page fault. In response to the page fault, a page 132 (FIG. 1) containing the data requested by the processor 114 is transferred from the mass storage device 130 into the main memory 118 as a page 132'. When the transfer is complete, the task dispatcher program 192 (a part of the operating system 190) is executed to select a processor 114 which will later reinitiate the read access to main memory 118. Then, the task dispatcher program 192 starts the prefetching of the requested data from main memory 118 into the cache subsystem 115 associated with the selected processor 114. The selected processor 114 that reinitiates the read access may be the same as or different from the processor 114 that originally initiated the read access. When the selected processor 114 reinitiates the read access, the associated cache subsystem 115 performs a lookup and a cache hit occurs (because the requested data has been prefetched there from main memory 118 previously). The cache subsystem 115 sends the selected processor 114 the requested data and the read access is complete. As a result, there is no cache miss due to the reinitiating of the read access as in prior art.

Figure 2:
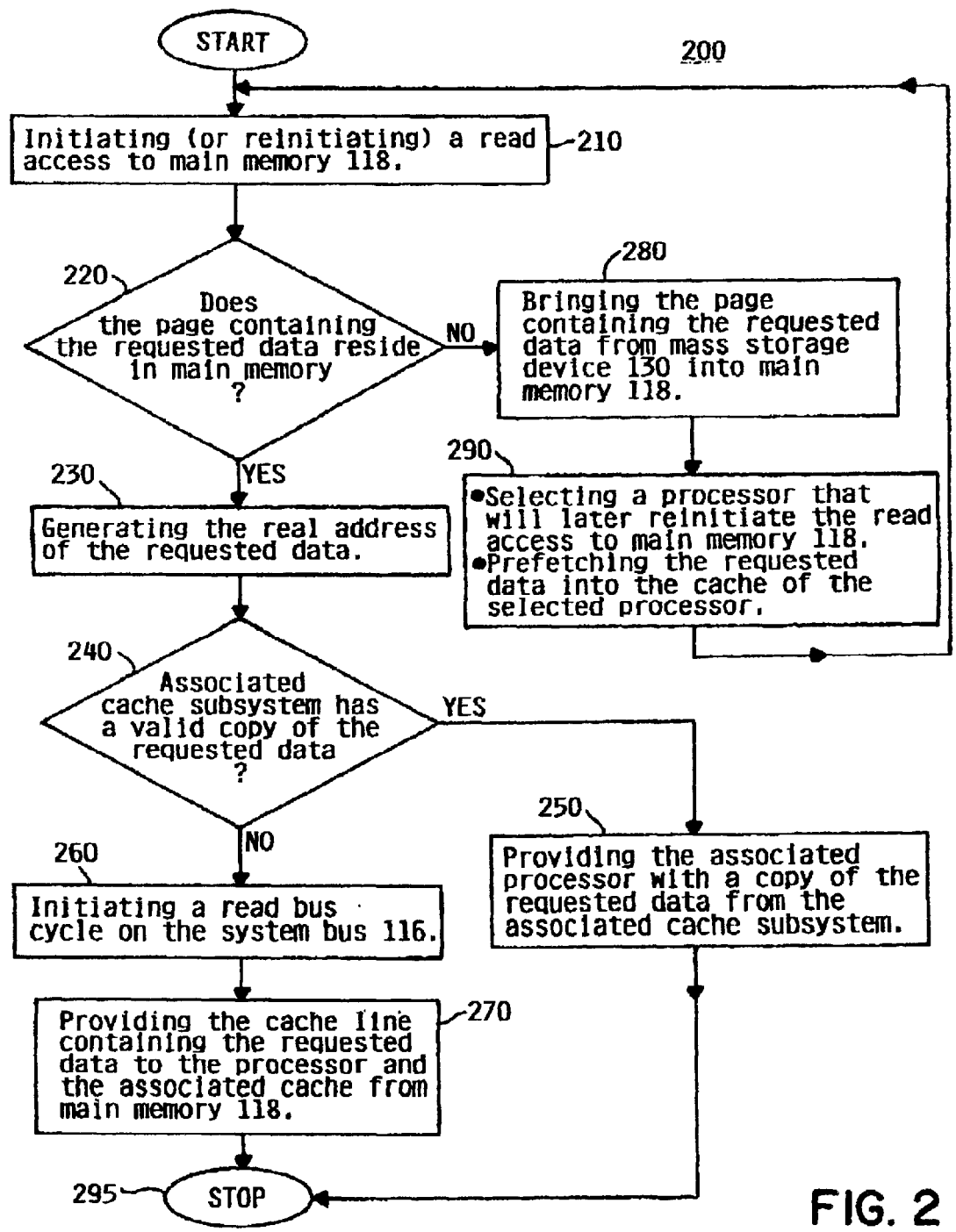
FIG. 2 shows the flowchart of a method 200 for operating the system 100 of FIG. 1 according to one embodiment of the present invention.

FIG. 2 shows the flowchart of a method 200 for operating the system 100 of FIG. 1 according to one embodiment of the present invention. The method 200 starts at step 210 where a read access to main memory 118 is initiated for data. In one embodiment, a processor 114, while performing a first task, initiates a read access to main memory 118 for data (or instruction). For illustration, assume the processor that initiates the read access in step 210 is the processor 114a. In step 220, a determination is made as to whether the page containing the requested data currently resides in the main memory 118. If so, in step 230, the processor 114a generates the real address of the requested data to its address pins. In response, in step 240, the cache subsystem 115a, which is associated with the processor 114a, receives the real address of the requested data from the processor 114a and performs a lookup to determine whether the cache subsystem 115a contains a valid copy of the data requested by the processor 114a. If so (i.e., a cache hit occurs), in step 250, the cache subsystem 115a provides the processor 114a with a copy of the requested data and the method 200 stops at step 295.

If step 240 is answered negatively, meaning the cache subsystem 115a does not contain a valid copy of the requested data, a cache miss occurs. In response to the cache miss, in step 260, the cache subsystem 115*a* initiates a read bus cycle on the system bus 116 to access the main memory 118 for the requested data. In one embodiment, the cache controller 117*a* of the cache subsystem 115*a* is configured to initiate the read bus cycle. In step 270, the main memory 118 provides the processor 114*a* and its associated cache subsystem 115*a* with a copy of the requested data via the system bus 116, and the method stops at step 295.

If the step 220 is answered negatively, meaning the page 132 (FIG. 1) containing the requested data does not currently reside in the main memory 118, but resides in mass storage device 130, a page fault occurs. In response, in step 280, the read bus cycle is canceled so that the page 132 containing the requested data can be brought from the mass storage device 130 into the main memory 118 as the page 132'. In one embodiment, in response to the page fault, the processor 114*a* stops the read access and switches from the first task to a page fault handler program 194. The page fault handler program 194, when executed by processor 114*a*, causes the processor 114*a* to set up and initiate a DMA (Dynamic Memory Access) transfer of the page 132 containing the requested data from the mass storage device 130 into the main memory 118 as the page 132'. Then, the processor 114*a* switches to a second task. The DMA transfer initiated by the processor 114*a* brings the page 132 containing the requested data from the mass storage device 130 into the main memory 118 as the page 132' without any help (i.e., independently) from any processor 114.

In one embodiment, when the DMA transfer is complete, in step 290, a processor 114 is selected to later reinitiate the read access, which was initiated by processor 114*a*. The selected processor can be any one of the processors 114 (including the processor 114*a*). Then, the requested data is prefetched from main memory 118 into the cache subsystem 115 associated with the selected processor 114.

In one embodiment, in step 290, the task dispatcher program 192 is executed by a processor 114 when the DMA transfer is complete. For illustration, assume the processor that executes the task dispatcher program 192 is the processor 114*b*. The task dispatcher program 192, when executed by processor 114*b*, causes the processor 114*b* to select a processor 114 which will later reinitiate the read access initiated by the processor 114*a*. The selected processor 114, which will later reinitiate the read access, can be any one of the processors 114. Assume the processor 114*c* is selected to later reinitiate the read access. Then, in one embodiment, the executed task dispatcher program 192 causes the processor 114*b* to generate a prefetch interrupt to the selected processor 114*c*. In response to the prefetch interrupt, the processor 114*c* stops whatever it is doing and switches to a prefetch interrupt handler program 196. The prefetch interrupt handler program 196, when executed by processor 114*c*, causes the processor 114*c* to prefetch the requested data from the main memory 118 into the processor's associated cache subsystem 115*c*.

In one embodiment of the present invention, a prefetch instruction 198 may be included in the prefetch interrupt handler program 196 (FIG. 1). When executed by the processor 114*c*, the prefetch instruction 198 causes the processor 114*c* to fetch a cache line containing the requested data from main memory 118 into the cache subsystem 115*c*.

In an alternative embodiment of the present invention, in step 290, instead of causing the processor 114*b* to generate the prefetch interrupt to the selected processor 114*c*, the task dispatcher program 192, when executed by processor 114*b*, causes the processor 114*b* to initiate a coherent prefetch bus cycle on the system bus 116. During the coherent prefetch bus cycle, the requested data is placed on the system bus 116 and the cache subsystem 114*c* gets a copy of the requested data from the system bus 116. As a result, this embodiment does not involve a prefetch interrupt handler program or a prefetch instruction.

In one embodiment, during the coherent prefetch bus cycle, the processor 114*b* indicates on the system bus 116 that the cache subsystem 115*c* is the target of the current bus cycle. The processor 114*b* also puts the bus cycle type (a coherent prefetch bus cycle) and the address of the requested data on the system bus 116. In response, the main memory 118 puts the requested data on the system bus 116 and the cache controller 117*c*, snooping the system bus 116, latches a copy of the requested data from the system bus 116 into the cache subsystem 115*c*. In an alternative embodiment, during the coherent prefetch bus cycle, the processor 114*b* puts the bus cycle type (a coherent prefetch bus cycle) and the address of the requested data on the system bus 116. In response, the main memory puts the requested data on the system bus 116 and all the cache controllers 117 (including the cache controller 117*c*), snooping on the system bus 116, latch a copy of the requested data from the system bus 116 into their respective cache subsystems 115.

After prefetching the requested data to the cache subsystem 115*c* of the selected processor 114*c*, the method 200 loops back to step 210 (second time). This time, the read access to the main memory 118 is reinitiated by the processor 114*c*, which was selected by the task dispatcher program 192 in step 290 (described above). In one embodiment, after prefetching the requested data to the cache subsystem 115*c* in step 290, the task dispatcher program 192 causes the processor 114*b* to set up the read access (in the first task) to be reinitiated by the selected processor 114*c*. Then, the task dispatcher program 192 causes the processor 114*b* to interrupt the processor 114*c*. In response, the processor 114*c* stops what it is doing and switches to the first task where the processor 114*a* left off (i.e., the read access).

In step 220, a determination is made as to whether the page containing the requested data currently resides in the main memory 118. Because the page containing the requested data has been previously brought into the main memory 118 in step 280, the step 220 is answered affirmatively. As a result, in step 230, the selected processor 114*c* generates the real address of the requested data on its address pins. In response, in step 240, the cache subsystem 115*c*, which is associated with the processor 114*c*, receives the real address of the requested data from the processor 114*c* and performs a lookup to determine whether the cache subsystem 115*c* contains a valid copy of the data requested by the processor 114*c*. Because a copy of the requested data has been previously prefetched to the cache 115*c* in step 290, the step 240 is answered affirmatively (i.e., a cache hit occurs). As a result, in step 250, the cache subsystem 115*c*, which is associated with the selected processor 114*c*, provides the processor 114*c* with a copy of the requested data, and the method stops at step 295. Therefore, there is not a cache miss caused by the reinitiating of the read access after a page fault as in prior art.

In summary, when a read access to main memory 118 for data causes a page fault, a subsequent cache miss can be avoided when the read access is reinitiated. More specifically, in response to the page fault, the page 132 containing the requested data is brought into the main memory 118 as the page 132' (step 280). Then, a processor 114 is selected and the requested data is prefetched into its associated cache 115 from the main memory 118 (step 290). After that, the selected processor 114 reinitiates the read access (step 210, a second time) resulting in a lookup in its associated cache 115 (step 240). Since the requested data is now in the cache 115, there is cache hit and the cache 115 provides the selected processor 114 with the requested data (step 250). As a result, there is not a cache miss caused by the reinitiating of the read access after a page fault as in prior art.

In one embodiment of the present invention, the input device 120, the input interface 121, the terminal 140, and the terminal interface 141 can be omitted from the digital system 100 of FIG. 1. However, the method 200 of FIG. 2 can still be used on the digital system 100 not having those omitted components.

In the embodiments described above, a particular processor 114 was described as performing some task. However, it is understood that any processor 114 in the system 100 can perform one or more of such tasks. For example, in step 290, the processor 114a, instead of the processor 114c, can be selected to reinitiate the read access. As a result, a copy of the requested data is prefetched into the cache subsystem 115a, instead of the cache 115c in step 290. Therefore, later in step 210 (second time), the processor 114a, instead of the processor 114c, reinitiates the read access and is then provided with a copy of the requested data by its associated cache 115a in step 250.

In the embodiments described above, there are three processors 114a, 114b, and 114c in the digital system 100. However, it is understood that the method 200 of FIG. 2 can still be used in a digital system 100 having one or more processors. For example, the system 100 may have only one processor. As a result, this single processor will perform all the steps of the method 200 of FIG. 2 that involve a processor. For instance, in step 210, the single processor initiates a read access to main memory 118. In step 290, the single processor 114 is selected to later reinitiate the read access and a copy of the requested data is prefetched into its associated cache 115. As a result, in step 210 (second time), this single processor 114 reinitiates the read access and is then provided with a copy of the requested data by its associated cache 115 in step 250.

In the embodiments described above, any of the cache subsystems 115 can be a look-aside cache, a type of cache that does not intercept processor read accesses to main memory 118. Instead, a look-aside cache snoops the processor bus and uses the address on the processor bus to perform a lookup. If a cache miss occurs, the cache does nothing, the read bus cycle is allowed to proceed on the system bus 116, and the main memory 118 provides the processor with the requested data. If a cache hit occurs, the cache 115 stops the read bus cycle and provides the processor 114 with the requested data. The method 200 can still be used whether any of the cache subsystems 115 is either a look-through cache or a look-aside cache.

While the foregoing is directed to embodiments of the present invention, other and further embodiments of the invention may be devised without departing from the basic scope thereof, and the scope thereof is determined by the claims that follow.

What is claimed is:

1. A method for prefetching data into a cache, comprising:
   interrupting execution of a first task on a first processor in response to detecting a page fault caused by initiating, during execution of the first task, a read access request for data not contained in a main memory;
   retrieving the data end placing the data in the main memory;
   performing one or more prefetch operations to transfer a copy of the data from the main memory to the cache, wherein the cache is associated with a second processor; and
   upon completion of the prefetch operations, resuming execution of the first task on the second processor by reinitiating the read access to retrieve the data from the cache.

2. The method of claim 1, wherein performing one or more operations to transfer a copy of the requested data from the main memory into the cache of the second processor in response to the requested data being brought into the main memory comprises causing the second processor to prefetch the requested data into the cache.

3. The method of claim 2, wherein causing the second processor to prefetch the requested data into the cache comprises:
   generating a prefetch interrupt to the second processor; and
   executing, with the second processor, a prefetch interrupt handler program to prefetch the requested data into the cache in response to the generated prefetch interrupt.

4. The method of claim 3, wherein executing, with the second processor, the prefetch interrupt handler program to prefetch the requested data into the cache in response to the generated prefetch interrupt comprises executing, with the second processor, a prefetch instruction to fetch a cache line containing the requested data from the main memory into the cache.

5. The method of claim 1, wherein prefetching the requested date from the main memory into the cache of the second processor in response to the requested data being brought into the main memory comprises:
   causing the main memory to put the requested data on a bus; and
   causing the cache to get a copy of the requested data from the bus.

6. The method of claim 5, wherein causing the main memory to put the requested data on the bus comprises putting an address of the requested data on the bus.

7. The method of claim 6, wherein causing the cache to get a copy of the requested data from the bus comprises causing the cache to snoop the bus.

8. The method of claim 7, wherein causing the cache to get a copy of the requested data from the bus is performed independently from the second processor.

9. The method of claim 5, wherein causing the cache to get a copy of the requested data from the bus comprises causing the cache to snoop the bus.

10. The method of claim 5, wherein causing the cache to get a copy of the requested data from the bus is performed independently from the second processor.

11. The method of claim 1, wherein the first and second processors are different processors.

12. A digital system, comprising:
one or more processors, each having an associated cache;
a main memory; and
an operating system configured to, in response to detecting a page fault caused by a read access initiated by one of the processors to request data not stored in the main memory, retrieve the requested data to main memory, cause a copy of the requested data to be stored in a cache associated with one of the processors, and generate a prefetch interrupt to the processor having the associated cache in which the copy of the requested data is to be stored to cause the processor having the associated cache in which the copy of the requested data is stored to prefetch the requested data from the main memory into the cache;
wherein, in response to the prefetch interrupt, the processor having the associated cache in which the copy of the requested data is to be stored is further configured to execute a prefetch interrupt handler program to prefetch the requested data into the cache in response to the prefetch interrupt in response to the generated prefetch interrupt.

13. The digital system of claim 12, wherein the processor having the associated cache in which the copy of the requested date is to be stored is further configured to execute a prefetch instruction in the prefetch interrupt handler program to fetch a cache line containing the requested data from the main memory into the cache.

14. A digital system, comprising:
one or more processors, each having an associated cache;
a main memory; and
an operating system configured to, in response to detecting a page fault caused by a read access initiated by a first one of the processors to request data not stored in the main memory while executing a first task;
interrupt the first task executing on the first processor;
cause a copy of the requested data to be stored in a cache associated with a second processor, different from the first processor; and
resume execution of the first task on the second processor by reinitiating the read access.

15. A method for prefetching data into a cache, comprising:
interrupting execution of a first task on a first processor in response to detecting a page fault caused by initiating, during execution of the first task, a read access request for date not contained in a main memory;
retrieving the data and placing the data in the main memory;
generating an interrupt to second processor, causing the second processor to perform one or more prefetch operations, in an interrupt handling routine, to transfer a copy of the data from the main memory to the cache, wherein the cache is associated with a second processor; and
upon completion of the prefetch operations, resuming execution of the first task on the second processor by reinitiating the read access to retrieve the date from the cache.

16. The method of claim 15, wherein the one or more prefetch operations comprises:
issuing a prefetch instruction, with the second processor, to load a cache line containing the requested data from the main memory into the cache in response to the generated prefetch interrupt.

* * * * *

UNITED STATES PATENT AND TRADEMARK OFFICE
CERTIFICATE OF CORRECTION

PATENT NO. : 6,922,753 B2
DATED : July 26, 2005
INVENTOR(S) : Jeffrey D. Brown, John D. Irish and Steven R. Kunkel It is certified that error appears in the above-identified patent and that said Letters Patent is hereby corrected as shown below:

Column 10,
Line 16, "end" should be -- and --.
Line 48, "date" should be -- data --.

Column 11,
Line 33, "date" should be -- data --.

Column 12,
Line 18, "date" should be -- data --.

Signed and Sealed this

Fourth Day of April, 2006

JON W. DUDAS
*Director of the United States Patent and Trademark Office*